United States Patent
Dorairaj

(10) Patent No.: US 9,462,064 B2
(45) Date of Patent: Oct. 4, 2016

(54) METHODS AND SYSTEMS FOR DELIVERING CONTENT

(71) Applicant: Comcast Cable Communications, LLC, Philadelphia, PA (US)

(72) Inventor: Sanjay Dorairaj, Mt. Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/642,247

(22) Filed: Mar. 9, 2015

(65) Prior Publication Data

US 2015/0244818 A1 Aug. 27, 2015

Related U.S. Application Data

(63) Continuation of application No. 13/662,996, filed on Oct. 29, 2012, now Pat. No. 9,015,274.

(51) Int. Cl.
| | |
|---|---|
| *G06F 15/16* | (2006.01) |
| *H04L 29/08* | (2006.01) |
| *H04N 21/239* | (2011.01) |
| *H04N 21/24* | (2011.01) |
| *H04N 21/262* | (2011.01) |
| *H04L 29/06* | (2006.01) |

(52) U.S. Cl.
CPC ........... *H04L 67/16* (2013.01); *H04L 67/2833* (2013.01); *H04L 67/42* (2013.01); *H04N 21/2396* (2013.01); *H04N 21/2402* (2013.01); *H04N 21/26216* (2013.01); *H04L 67/1002* (2013.01)

(58) Field of Classification Search
CPC ... H04L 67/16; H04L 67/2833; H04L 67/42; H04L 67/1002
See application file for complete search history.

(56) References Cited

U.S. PATENT DOCUMENTS

| | | | |
|---|---|---|---|
| 6,681,251 B1* | 1/2004 | Leymann | H04L 67/1008 709/203 |
| 7,787,818 B2 | 8/2010 | Shapiro et al. | |
| 7,930,723 B2* | 4/2011 | Mikkelson | H04H 20/40 725/116 |
| 8,498,628 B2 | 7/2013 | Shapiro et al. | |
| 8,516,146 B1 | 8/2013 | Yen | |
| 9,015,274 B2* | 4/2015 | Dorairaj | 709/217 |
| 2004/0044731 A1 | 3/2004 | Chen et al. | |
| 2005/0149875 A1 | 7/2005 | Shaw et al. | |
| 2006/0234762 A1 | 10/2006 | Ozluturk | |
| 2006/0248553 A1* | 11/2006 | Mikkelson | H04H 20/40 725/23 |
| 2006/0277278 A1 | 12/2006 | Hegde et al. | |
| 2008/0201341 A1* | 8/2008 | Okamoto | H04N 21/2312 |
| 2008/0242280 A1 | 10/2008 | Shapiro et al. | |
| 2009/0125773 A1* | 5/2009 | Lee | H04L 67/06 714/748 |
| 2009/0138479 A1 | 5/2009 | Chiu | |
| 2012/0140750 A1 | 6/2012 | Yan et al. | |
| 2013/0031279 A1 | 1/2013 | Venugopal et al. | |
| 2013/0111031 A1 | 5/2013 | Hoffmann | |
| 2013/0326068 A1 | 12/2013 | Yen | |
| 2015/0172200 A1* | 6/2015 | Yen | H04L 67/16 709/203 |

* cited by examiner

*Primary Examiner* — Moustafa M Meky
(74) *Attorney, Agent, or Firm* — Ballard Spahr LLP

(57) ABSTRACT

This disclosure relates to methods and systems for delivering content such as enhanced television applications over a network. In one exemplary method, a request for a content item is received. The request is added to a request queue. Each application requested is then identified and then the exemplary method waits for the occurrence of a predetermined event. Upon the occurrence of a predetermined event, the exemplary method provides for sending a single instance of each content item, regardless of the number of requests for each such content item.

20 Claims, 5 Drawing Sheets

METHODS AND SYSTEMS FOR DELIVERING CONTENT

CROSS REFERENCE TO RELATED PATENT APPLICATION

This application is a Continuation of U.S. Non-Provisional application Ser. No. 13/662,996 filed Oct. 29, 2012, herein incorporated by reference in its entirety.

BACKGROUND

A system in which multiple users demand attention from a limited resource must be capable of handling scenarios in which the users simultaneously ask for more than the system can deliver. An example of this includes a unicast messaging system in which a private or unique resource is requested and returned directly to the user. In some instances, this can result in a system wherein a server cannot always fulfill a request right away. One way of dealing with potential logjams in such a system is to implement queues that cause each requested transaction to be handled in turn. Carousel type systems, such as first-in first-out (FIFO) and first-in last-out (FILO) are common queue implementations, in which transactions are handled either in the order in which they are received (FIFO) or from newest to oldest (FILO).

Modern content and application distribution can involve significant bandwidth demands. However, many networks are limited in the amount of network bandwidth they have available. Conventional solutions for media and application distribution can be bandwidth costly. For example, in certain systems, several users may request the same content at the same time. These multiple requests can place a high demand on the network. This is because each request, and the response thereto, consumes its own bandwidth when the content is ultimately delivered. Although known queue implementations have the effect of handling application requests in turn, they do not address the bandwidth issues that can arise when a system is under heavy demand.

SUMMARY

It is to be understood that both the following general description and the following detailed description are exemplary and explanatory only, and are not restrictive, as claimed. Provided are methods and systems for delivering enhanced television applications and content over a limited bandwidth network.

In one aspect, a method for delivering content, such as, for example, active content or enhanced television applications is disclosed. The method starts when a request for content is initiated. The request for the content is added to a request queue. Next, the method identifies each content item requested and waits for the occurrence of a predetermined event. Upon the occurrence of the predetermined event, the method sends a single instance of the content item requested, regardless of the number of requests for each such content item.

In a further aspect, the method for delivering content further involves determining the identity of a computing device such as an application server configured to support the requested content, storing an indication of the identity of the computing device, and associating an indication of the identity of the computing device with the single instance of each content item. The method may further include determining whether the stored indication of the identity of the computing device matches the indication of the identity of the computing device associated with a content item, and receiving the content item.

In another aspect, a system for delivering content, such as, for example, active content or enhanced television comprising a plurality of addressable devices, such as, for example, addressable converters is disclosed. A computing device such as a network controller is configured to receive requests for content from the addressable devices. Similarly, a computing device such as an application server is configured to receive requests for content items from the network controller and to add the request to a request queue. The computing device, upon the occurrence of a predetermined event, identifies the content items in the request queue and delivers one instance of each content item requested, without regard to the number of requests for each content item in the request queue.

In a further aspect of the system for delivering content, such as, for example, active content or enhanced television applications, an addressable converter is provided, such as a gateway computing device or a set top box. The predetermined event disclosed in the system can be the expiration of a timer. Furthermore, each application may be delivered to a plurality of addressable devices. Each addressable device filters out applications it did not request. The addressable device can also store an indication of the identity of the computing device from which it requested the content. The indication of the identity of the computing device can be, for example, a sixteen-bit value. Furthermore, the network controller can insert the indication of the identity of the computing device in each content item it receives prior to delivering the content item to the plurality of addressable devices. Therefore, the addressable devices can identify requested applications based on the identity of the computing device inserted into the application.

In another aspect, a method for delivering content, such as interactive content, is disclosed. The method comprises requesting content from a computing device such as a content server by a first requestor and storing the indication of the identity of the content server. The method further determines whether a second requestor has requested the content within a predetermined period. The method delivers the content once to both the first requestor and the second requestor upon determining the content has been requested by the second requestor within a predetermined period.

In a further aspect, the method for delivering content determines whether the content has been requested by the second requestor within a predetermined time period by receiving, at the content server, a plurality of requests for content within the predetermined period; and inserting each request for content into a request queue.

In another aspect, the method for delivering content comprises the steps of serving, after the expiration of the predetermined period, one instance of each requested item of content, without regard to the number of requests for the requested item; and discarding, by each requestor, content that the requestor did not request. The discarding step comprises discarding content that does not include the indication of the identity of the content server from which the content was requested.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
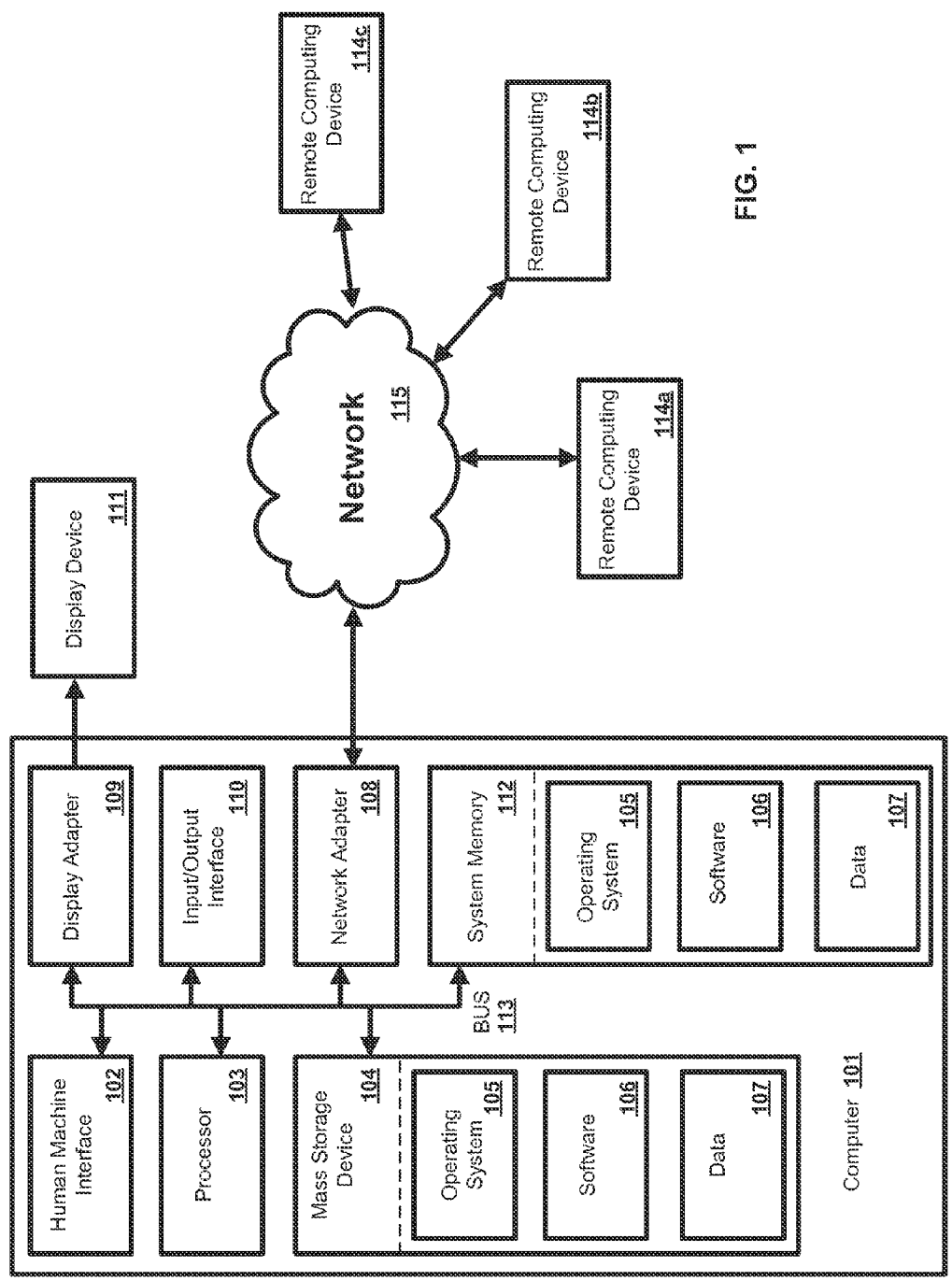
FIG. 1 is a block diagram illustrating an example of a computer system in which the methods and systems described herein can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where the event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

As will be appreciated by one skilled in the art, the methods and systems can take the form of an entirely hardware embodiment, an entirely software embodiment, or an embodiment combining software and hardware aspects. Furthermore, the methods and systems can take the form of a computer program product on a computer-readable storage medium having computer-readable program instructions (e.g., computer software) embodied in the storage medium. More particularly, the present methods and systems can take the form of web-implemented computer software. Any suitable computer-readable storage medium can be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions can be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions can also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions can also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates various aspects of an exemplary system in which the present methods and systems can operate. The present disclosure relates to delivering enhanced television applications over a limited bandwidth network. Those skilled in the art will appreciate that present methods can be used in systems that employ both digital and analog equipment. One skilled in the art will appreciate that provided herein is a functional description and that the respective functions can be performed by software, hardware, or a combination of software and hardware.

FIG. 1 is a block diagram illustrating an exemplary operating environment for performing the disclosed methods. In an exemplary aspect, the method and systems can be implemented on a computer 101 described below. The methods and systems disclosed can utilize one or more computers to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments and/or configurations that can be suitable for use with the systems and methods comprise, but are not limited to, personal computers, server computers, laptop devices, and multiprocessor systems. Additional example comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote storage media including memory storage devices.

Further illustrated in FIG. 1, one skilled in the art will appreciate that the systems and methods disclosed herein can be implemented via a general-purpose computing device in the form a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, software 106, data 107, a network adapter 108, system memory 112, an input/output interface 110, a display adapter 109, a display device 111, a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, as well as, removable and non-removable media. The system memory 112 comprises computer readable media in the form of volatile memory, such as random access memory (RAM), and/or non-volatile memory, such as read only memory (ROM). They system memory 112 can contain data such as media, video, audio, or other data 107 and/or program modules such as operating system 105 and software 106 capable of manipulating, translating, transcoding, or otherwise editing the data 107 that are immediately accessible to and/or presently operated on the by the processing unit 103.

In another aspect, the computer 101 can also comprise other removable/non-removable, volatile/non-volatile computer storage media. By way of example, FIG. 1 illustrates a mass storage device 104, which can provide non-volatile storage of computer code, computer readable instructions, data structures, program modules and other data for the computer 101. For example, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and media manipulation software 106. Each of the operating system 104 and media manipulation software 106 (or some combination thereof) can comprise elements of the programming and the media manipulation software 106. Media, video, audio, or other data 107 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

In another aspect, the user can enter commands and information into the computer 101 via an input device (not shown). Example of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 103 via a human machine interface 102 that is coupled to the system bus 113, but can be connected by other interface and bus structures, such as a parallel port, game port, and IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109, and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown), which can be connected to the computer 101 via input/output interface 110. Any step and/or result of the methods can be output in any form to an output device. Such output can be any form of visual representation, including but not limited to, textual, graphical, animation, audio, tactile, and the like. The display 111 and computer 101 can be part of one device, or separate devices.

The computer 101 can operate in a networked environment using logical connections to one or more remote computing devices 114*a,b,c*. By way of example, a remote computing device can be a personal computer, portable computer, smartphone, a server, a router, a network computer, a peer device or other common network node, and so on. Logical connections between the computer 101 and remote computing device 114*a,b,c* can be made via a network 115, such as a local area network (LAN) and or a general wide area network (WAN). Such network connections can be through a network adapter 108. A network adapter 108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of media manipulation software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent system (e.g. Expert interference rules generated through a neural network or production rules from statistical learning).

Figure 2:
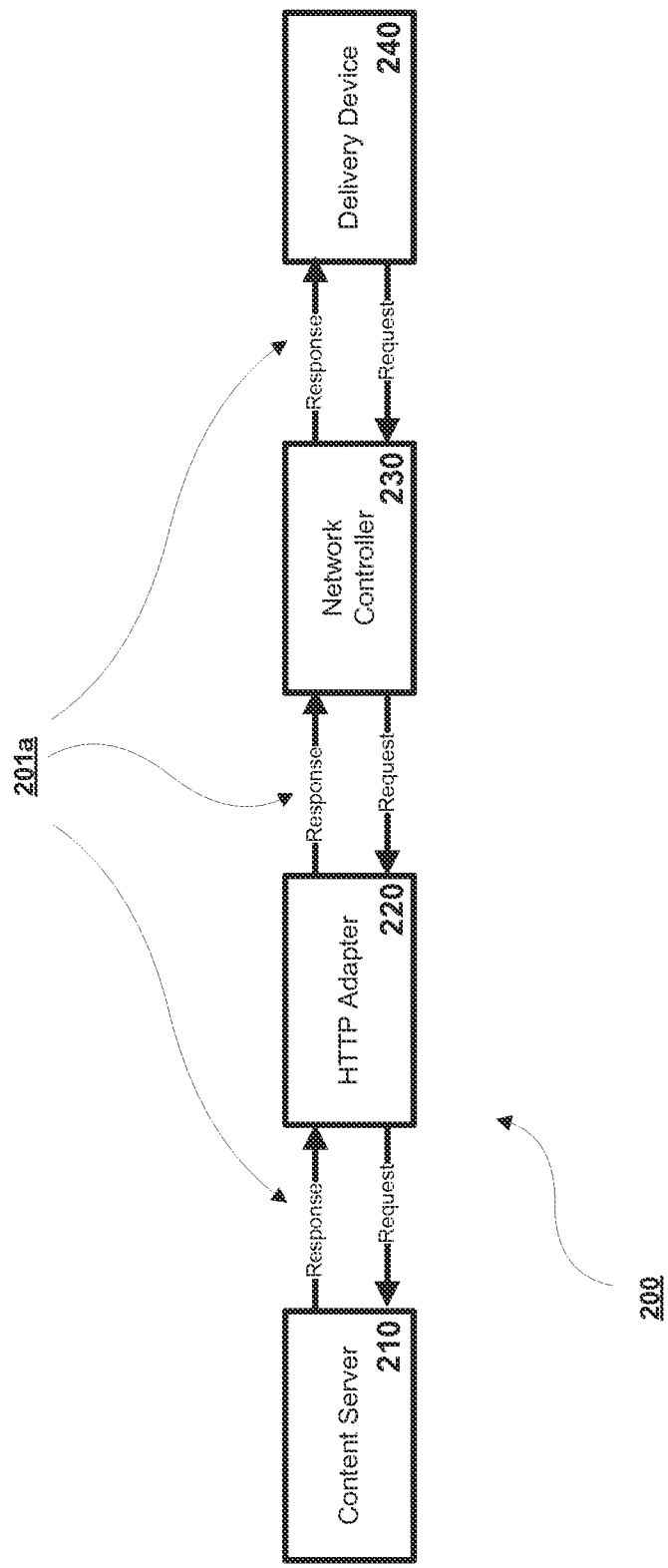
FIG. 2 is a block diagram illustrating an example of an embodiment of a content delivery system described herein.

Turning now to FIG. 2, a distribution system 200 is illustrated that can distribute signals from a content (or application) server 210 to a delivery device 240 at a user location. The distribution system 200 can include connections between devices 201*a* using, for example, an optical fiber network, a coaxial cable network, a hybrid fiber-coaxial network, a wireless network, a satellite system, a direct broadcast system, or any combination thereof. In an exemplary embodiment, the various components of the distribution system 200 of FIG. 2 can comprise computing devices as described in FIG. 1 above. The methods and systems disclosed can be located within one or more combinations of the remote computing devices 114*a, b, c* and/or within the system memory 112 and/or mass storage 104 of the computer 101.

The system 200 includes one or more user locations having delivery devices 240 connected via a network 201*a* to the content server 210 of the distribution system. A delivery device 240 may also include or be coupled to a display device for presenting the signals to a user. A delivery device 240 can be, by way of example, a gateway, a set-top box (STB), a personal computer, a handheld device, a tablet, a mobile telephone, a home communications terminal (HCT), or the like. A display device can include, for example, a television set (TV), a computer monitor, or a handheld display. Those skilled in the art will appreciate that the signal broadcast over the distribution system 200 can be decoded by a variety of devices, including those listed above. The user location need not be fixed. By way of example, a user can receive content from the distribution system 200 on a delivery device 240 that is mobile, such as a laptop computer, PDA, smartphone, GPS, vehicle entertainment system, portable media player, and the like.

In an exemplary embodiment, the distribution system 200 of FIG. 2 can broadcast signals that utilize methods and systems employing digital audio/video compression techniques such as Moving Pictures Experts Group (MPEG) standards, or any other type of compression. These can include, by way of example only, MPEG-1, MPEG-2, and MPEG-4. Such exemplary video standards, including other standards that can be used in the system disclosed herein, such as Flash, Silverlight, and other streaming and/or audio/video compression standards, are well known to persons of ordinary skill in the art and can be used without departing from the spirit and scope of the disclosure.

Turning again to FIG. 2, an exemplary embodiment of the distribution system 200 for delivering content is illustrated. One skilled in the art will appreciate that the systems and methods disclosed herein can be implemented via a general-purpose computing device in the form of a content/application server 210, an HTTP adapter 220, a network controller 230, and a delivery device 240. Although FIG. 2 illustrates just one of each component, it is understood that in a distribution system, there can be a plurality of each of the components. The content/application server 210 can be, by way of example, a computing device such as a computer server communicating over a network 201*a* in the distribution system 200 that is connected to the delivery device 240. The delivery device 240 can be a computing device, which, in an exemplary embodiment, is an addressable device, such as, by way of example, a television set-top box (STB), addressable converter, desktop computer, tablet computer, mobile phone, mobile computing device, or any device capable of rendering the content or applications delivered by the distribution system 200.

The delivery device 240 includes a map that correlates the address of the content server 210 (such as its URL) with an identifier. By way of example, the identifier can be a binary number, such as a sixteen-bit address. In certain embodiments, the system 200 may be designed such that space is included in the content stream that can be used for such an identifier, sometimes referred to as a multicast address. A sixteen-bit multicast address is sometimes referred to as a multicast-16 address. In an exemplary embodiment, the identifier can be designed such that it will fit into space set aside for a multicast-16 address. In alternative exemplary embodiments, other space in the stream, or files or metadata associated with the stream can be used.

The identifier can be any series of bits that can be included in content (or metadata relating to content) that is delivered to the delivery device 240. In an exemplary embodiment, the identifier represents the content server 210 itself. In an alternative exemplary embodiment, the identifier can represent a particular item of content received from a particular content server 210. This map allows the delivery device 240 to set a filter that will watch for content that includes (either directly, or with associated metadata) the identifier of the server from which content was requested. When the filter identifies content from a content server 210 from which content has been requested, the delivery device 240 will know that it should receive that content.

The content server 210 and delivery device 240 are in communication with each other via the HTTP adapter 220 and the network controller 230. These components work in coordination to provide a method of delivering content, such as video, audio, and enhanced television (ETV) applications.

The content server 210 receives a request for an application from one or more delivery device(s) 240. By way of example only, a user operating a delivery device 240 can request content or an application. In an alternative exemplary embodiment, the delivery device 240 sends an HTTP GET request to request content or an application.

In an exemplary embodiment, the content server 210 continues to receive requests from delivery devices 240 and adds them to the queue. The content server 210 awaits the occurrence of a predetermined event. The predetermined event can include, for example, the expiration of a timer, a threshold number of application requests, opening of additional bandwidth on the network 201a, an administrative action, or any event that would be suitable for improving the usage of bandwidth on the network 201a. By way of example, the timer can be set to a predetermined time period, such as three seconds. The predetermined event is selected such that fewer network resources might be used by delivering content that has been requested multiple times, yet is delivered only once.

Upon the occurrence of the predetermined event, the content server 210 reviews the request queue and sends a single instance of the content or application to the one or more delivery device(s) 240 requesting the content or application, regardless of the number of requests. By sending a single instance of each item of content or application requested to one or more requesting delivery device(s) 240 bandwidth usage is reduced in comparison to conventional methods that deliver content once per request. Broadcasting a single instance of the content or application allows multiple requesters (a plurality of delivery devices 240) of the application to receive the content or application at the same time. Therefore, the content sever 210 does not have to immediately respond to individual requests, which would place multiple instances of the content or application on the network at various times, which unnecessarily increases the use of network bandwidth. This can be useful both during normal system operation to reduce the load on the system, and when the system has encountered a failure or other degradation in service, during and after which users tend to send additional requests for content at or near the same time.

In an exemplary embodiment, once a user operating the delivery device 240 requests content and/or an application, the delivery device 240 initiates an application request by sending, for example, an HTTP GET request for the specified application or content. The HTTP GET request includes the universal resource locator (URL) for the content or application. The delivery device 240 transmits the request to a network controller 230 that is in communication with the delivery device 240. The network controller 230 translates requests and data from one or more delivery device(s) 240 into one or more format(s) that can be read and interpreted over a network 201a. The network controller 230 includes a map that correlates the content server's identifier (as discussed above) with the network subnet or ports from which the requests for content were received. This map allows the network controller 230 to append the identifier to any content directed to devices that may have requested content from a given content server 210 associated with the identifier.

By way of example, the network controller 230 receives the request from the delivery device 240, and identifies the address of the content server 210 from which the content has been requested. The network controller 230 then constructs a user datagram protocol (UDP/IP) packet that can include information about both the application and/or content requested and about the identity, specifications and IP address of the delivery device 240. This UDP/IP packet would then be forwarded, for example, to the HTTP adapter 220.

In an exemplary embodiment, the HTTP adapter 220 receives various incoming UDP/IP packets. The HTTP adapter 220 assembles the various packets to create a coherent HTTP message, performs session-management functions, and delivers the HTTP message to the content server 210. Once the HTTP adapter 220 receives an incoming UDP/IP packet it determines if the request is valid by employing any of the various authentication methods known in the art. If the request is valid, the message can be forwarded to the appropriate content server 210. The content server 210 returns a downstream HTTP OK response with the requested content or application resource message in the message body via the HTTP adapter 220 and network controller 230 to the delivery device 240.

In an exemplary embodiment, the HTTP adapter 220 includes a map that correlates content server addresses with network controllers. By way of example, this map allows the HTTP adapter 220 to direct content from a given content server 210 to the network controller(s) that requested content from that content server 210.

Several components of the system 200 have been described as having maps that allow the components to correlate requested content with the destination of that content as it moves through the system 200. Although the exemplary embodiment described herein includes the maps in particular devices within the system, the system 200 is not limited to including particular maps on a particular device. For example, the maps could exist on a separate system or computing device that is in communication with, and can be referenced or accessed by the components of the system 200. In an alternative example, the maps could be embedded in the content itself, or in metadata associated with the content. As one of ordinary skill in the art would understand, the location and format of the maps are an implementation detail, so long as the components of the system 200 have access to information that correlates a request for content and the corresponding result to the components through which the request traveled.

Figure 3:
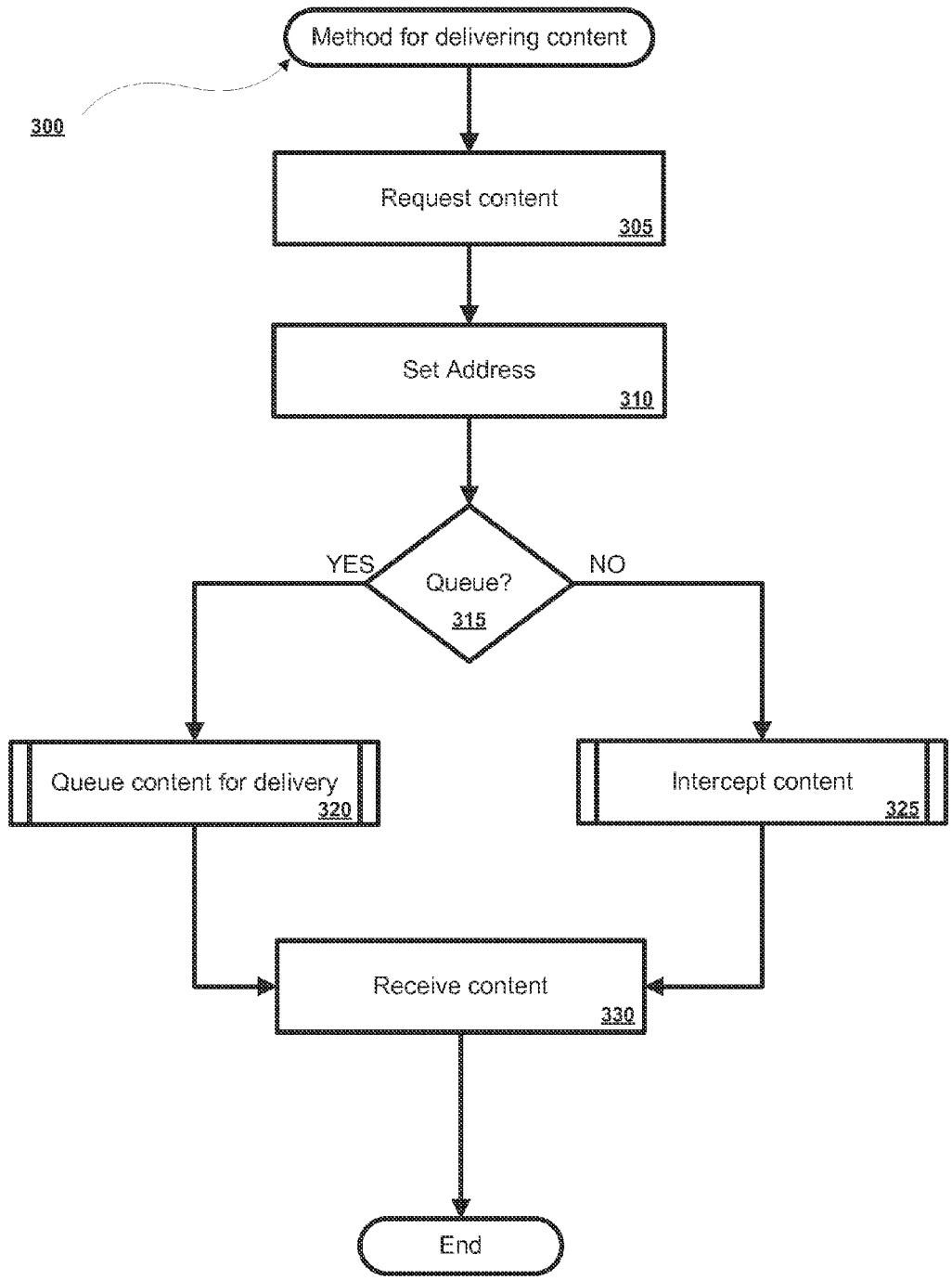
FIG. 3 is a flow chart illustrating an example of an embodiment of a method for delivering content in accordance with the exemplary system described in FIG. 2.

Turning now to FIG. 3, a flow chart illustrating an exemplary method 300 of delivering content in accordance with the present disclosure is shown. FIG. 3 will be discussed with reference to FIG. 1 and FIG. 2. Beginning with step 305, in an exemplary embodiment, a user of the delivery device 240 initiates a content or application request from the delivery device 240 to the content server 210. The initiation of an application request can include initiating a HTTP GET request as explained in the discussion of FIG. 2 above. The HTTP adapter 220 and network controller 230 both perform any protocol adaptation and then the request is forwarded to the content server 210. In an alternative exemplary embodiment, the request is created by another system, computer, network of computers, or other entity, and eventually stored in or transmitted to the content server 210. The method then proceeds to step 310.

In step 310, the address of the server is set. In the exemplary embodiment, the address of the server is the address of the content server 210, discussed in FIG. 2 above. Setting the address of the server includes creating an identifier for the content server 210, as discussed above, and setting filters on the delivery device 240 that will identify content or applications that are associated with that identifier. Content or applications associated with the identifier will be understood to be directed to the delivery device 240. Once the requested application has been mapped to a specific content server 210, the method proceeds to step 315.

In an exemplary embodiment, the method at step 315 determines if the request is queued at the content server 210. If the determination in step 315 is affirmative, the YES branch is followed to step 320. In step 320, content is queued for delivery at the content server 210. Step 320 will be discussed in greater detail with respect to FIG. 4.

Turning again to step 315, if it is determined that requests are not to be queued at a content server 210, the method follows the NO branch to step 325. In step 325, the delivery device attempts to intercept content prior to sending a request. The method of step 325 will be discussed in greater detail with respect to FIG. 5.

In either case, the method then proceeds to step 330, wherein the content is received. At step 330, the HTTP adapter 220 receives an HTTP POST message from the content server 210. Once the HTTP adapter 220 receives the HTTP POST request, it refers to its map that correlates content servers 210 to network controllers 230 to determine the IP address(es) of network controllers 230 from which requests for the content or application were received. The HTTP adapter 220 forwards the HTTP POST as a UDP/IP message to the identified network controller(s) 230.

The network controller 230 receives the UDP/IP message from the HTTP adapter 220. The network controller 230 can then refer to its map that correlates content servers 210 to identifiers so as to determine the identifier to associate with the content. In an exemplary embodiment, the network controller then embeds the identifier in the content. In an alternative exemplary embodiment, the network controller 230 includes the identifier in metadata associated with the content. The network controller 230 then sends the content to all of the delivery device(s) 240 that are connected to it.

The delivery device(s) 240 then receive the content. Those delivery devices 240 that have requested the content will have previously set filters to identify content that includes the identifier. By way of example, the filters can be MPEG program filters. Once the requested content or application is received in its entirety the method 300 ends.

Figure 4:
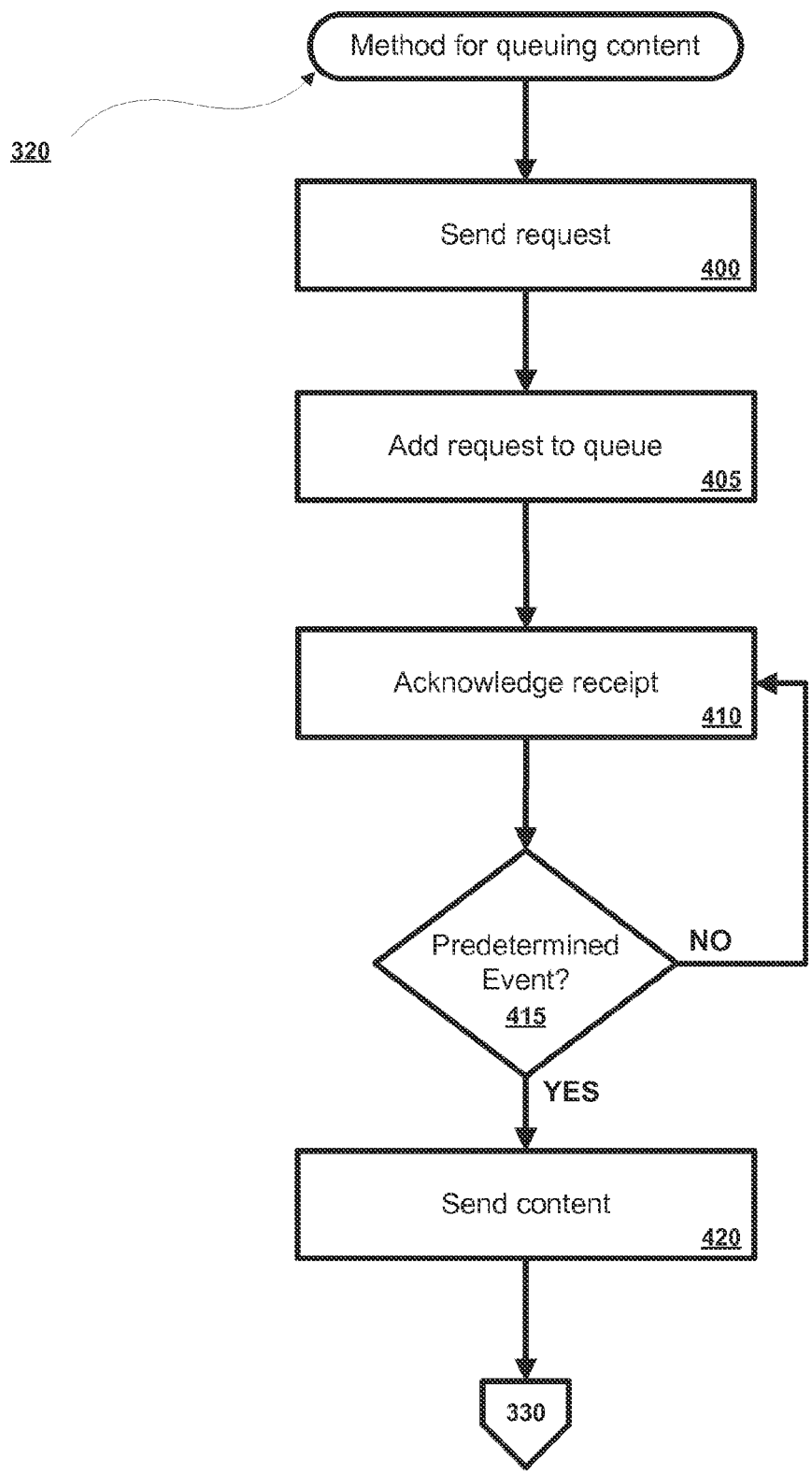
FIG. 4 is a flow chart illustrating an example of an embodiment of a method for queuing content in the method of FIG. 3.

Turning now to FIG. 4, a flow chart of an exemplary method for queuing content is illustrated. In step 400 the application request is sent to the content server 210. The content server 210 receives the application request and it is added to the queue at step 405. The content server 210 also records the identity, such as the IP address, of the delivery device 240 associated with the request.

Once this information is recorded, the content server 210 acknowledges the receipt of the request at step 410 by sending, for example, an HTTP OK response to the delivery device 240 via the HTTP adapter 220 and the network controller 230. Once the delivery device 240 receives the response, the delivery device 240 waits for content delivery. For example the delivery device 240 can set filters to listen for signals containing the identifier associated with the content server 210. In an exemplary embodiment, the delivery device 240 sets MPEG program filters to listen for a multicast address that identifies the content server for the requested content or application.

The method proceeds to step 415, wherein it is determined whether a predetermined event, as discussed above, has occurred. If the determination is negative, the NO branch is followed and the method 320 returns to step 410. If, on the other hand, the determination in step 415 is affirmative, the method 320 proceeds to step 420 where the content server 210 checks its request queue and sends any requested content to the HTTP adapter 230. In an exemplary embodiment, the requested content is sent by transmitting an HTTP POST message to the HTTP adapter 220. The method then returns to step 330 of FIG. 3 where the content is delivered to the delivery device 240.

Figure 5:
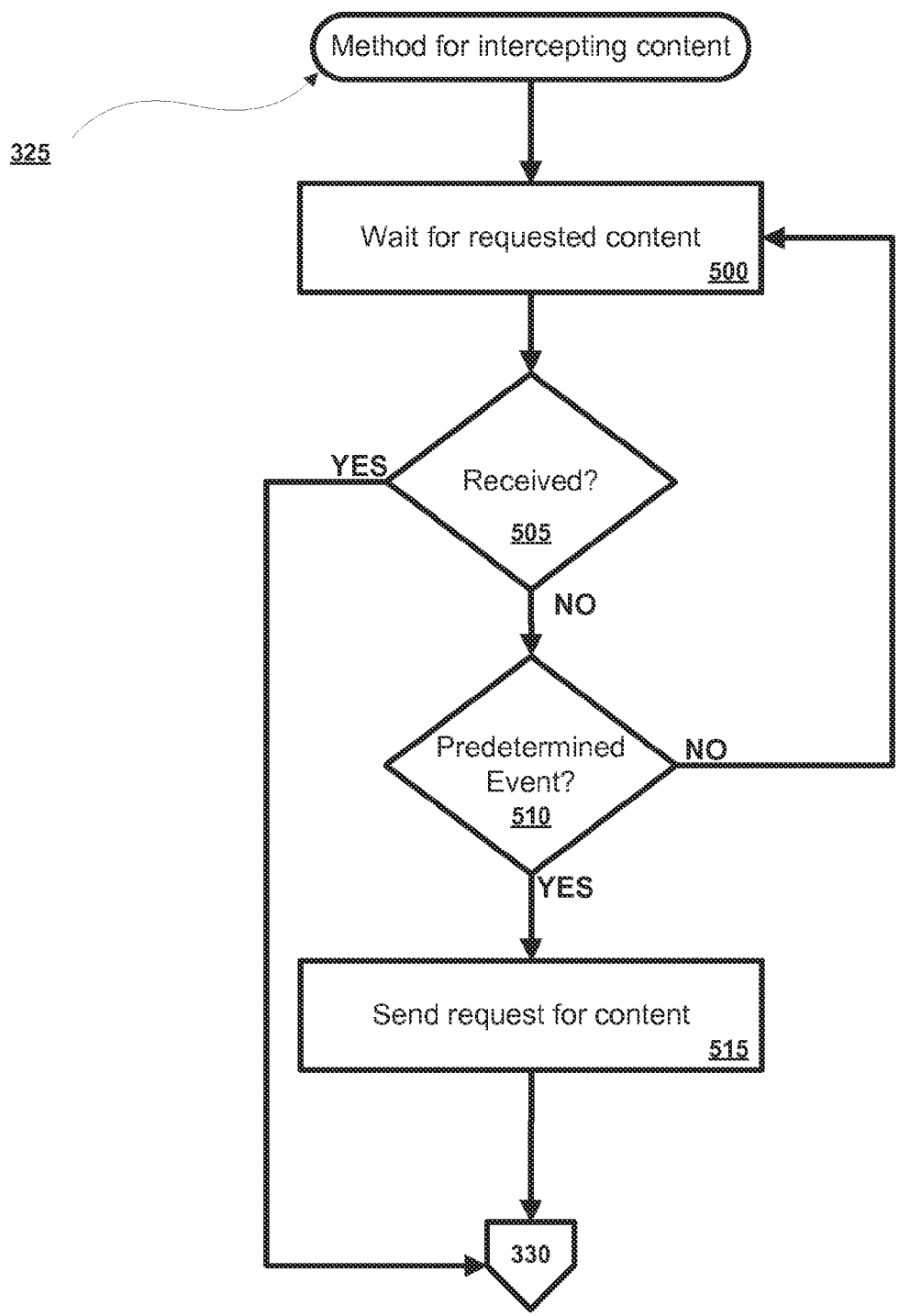
FIG. 5 is a flow chart illustrating an example of an embodiment of a method for intercepting content in the method of FIG. 3.

Turning now to FIG. 5, a method 325 for intercepting content is illustrated. In this exemplary embodiment, when content or an application is requested, rather than immediately sending the request to the content server 210 for queuing, the delivery device 240 listens for the content it will request until a predetermined event occurs. In this way, in the event another delivery device 240 has already requested the same content, the delivery device 240 can simply receive the content sent in response to the request of the other delivery device 240.

In an exemplary embodiment, at step 500, after the user requests content or an application, the delivery device 240 calibrates/recalibrates its filters, such as, in an exemplary embodiment, its MPEG program filters, to listen for multicast signals containing an identifier that identifies the source of the requested content or application. The method 325 then proceeds to step 505, wherein it is determined whether the content was received. If the determination in step 505 is negative, the method follows the NO branch to step 510, wherein it is determined whether the predetermined event has occurred. If the determination in step 510 is negative, the method follows the NO branch back to step 500, where the system 200 continues to wait for content or application.

Returning to step 505, if the delivery device 240 identifies, by way of its filters, content that includes or is associated with the identifier of the content server from which the content was requested, the method follows the YES branch and returns to step 330 of FIG. 3 and receives the content.

Returning to step 510, if the predetermined event has occurred, the YES branch is followed to step 515, wherein the delivery device 240 sends the request for the content or application to the content server 210. The method then returns to step 330 of FIG. 3 and receives the content or application.

The methods and systems have been described in connection with preferred embodiments and specific examples. It is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving an indication to generate a request for content associated with a content server by a first requestor;
   storing an identifier of the content server associated with the content;
   determining whether the request for the content is to be queued at the content server;
   determining whether the content has been requested by a second requestor within a predetermined period if the request for the content is not to be queued at the content server; and
   receiving the content at the first requestor in response to determining the content has been requested by the second requestor within the predetermined period.

2. The method of claim 1, wherein receiving the content at the first requestor in response to determining that the content has been requested by the second requestor within the predetermined period comprises:
   monitoring communications from one or more content servers during at least a portion of the predetermined period; and
   discarding, by the first requestor, content that the first requestor did not request.

3. The method of claim 2, wherein discarding, by the first requestor, the content that the first requestor did not request comprises discarding content that does not comprise the identifier of the content server associated with the content.

4. The method of claim 1, wherein determining whether the content has been requested by the second requestor within the predetermined period if the request for the content is not to be queued at the content server comprises:
   monitoring communications from one or more content servers during at least a portion of the predetermined period; and
   determining whether the communications received from the one or more content servers within the predetermined period comprise the content based on the identifier of the content server.

5. The method of claim 1, further comprising canceling the request for the content.

6. The method of claim 1, further comprising:
   generating the request for the content if the predetermined period lapses; and
   sending the request for the content to the content server.

7. The method of claim 6, further comprising:
   monitoring communications from one or more content servers; and
   determining whether the communications from the one or more content servers comprise the content.

8. The method of claim 6, further comprising receiving the content at the first requestor after a predetermined event has occurred.

9. A method, comprising:
   receiving an indication to generate a request for content associated with a content server by a first requestor;
   storing an identifier of the content server associated with the content;
   determining whether the request for the content is to be queued at the content server;
   generating the request for the content if the request for the content is to be queued at the content server;
   sending the request for the content to the content server;
   filtering, by the first requestor, content transmitted by one or more content servers by comparing the identifier stored to identifiers of the transmitted content; and
   receiving the content at the first requestor after a predetermined event has occurred and the identifier stored matches an identifier of the transmitted content.

10. The method of claim 9, further comprising receiving an acknowledgment receipt from the content server in response to the content server receiving the request for the content.

11. The method of claim 9, wherein the predetermined event is at least one of an expiration of a timer, exceeding a threshold number of requests in a request queue for the content, or detecting additional bandwidth.

12. The method of claim 9, further comprising:
    determining whether the content has been requested by a second requestor within a predetermined period if the request for the content is not to be queued at the content server; and
    receiving the content at the first requestor in response to determining that the content has been requested by the second requestor within the predetermined period.

13. The method of claim 12, wherein determining whether the content has been requested by the second requestor within the predetermined period if the request for the content is not to be queued at the content server comprises:
    monitoring communications from the one or more content servers during at least a portion of the predetermined period; and
    determining whether the communications from the one or more content servers within the predetermined period comprise the content.

14. The method of claim 13, further comprising:
    receiving the content when one or more of the communications from the one or more content servers comprise the content; and
    canceling the request for the content.

15. An apparatus, comprising:
    a memory; and
    a processor configured to,
      receive an indication to generate a request for content associated with a content server,
      store an identifier of the content server associated with the content,
      determine whether the request for the content is to be queued at the content server,
      determine whether the content has been requested by a requestor within a predetermined period if the request for the content is not to be queued at the content server, and receive the content in response to determining the content has been requested by the requestor within the predetermined period.

16. The apparatus of claim 15, wherein the processor is further configured to:
monitor communications from one or more content servers during at least a portion of the predetermined period; and
discard content that the first requestor did not request.

17. The apparatus of claim 16, wherein the processor is further configured to discard content that does not comprise the identifier of the content server associated with the content.

18. The apparatus of claim 15, wherein the processor is further configured to:
monitor communications from one or more content servers during at least a portion of the predetermined period; and
determine whether the communications received from the one or more content servers within the predetermined period comprise the content based on the identifier of the content server.

19. The apparatus of claim 15, wherein the processor is further configured to cancel the request for the content.

20. The apparatus of claim 15, wherein the processor is further configured to:
generate the request for the content if the predetermined period lapses; and
send the request for the content to the content server.

* * * * *